(12) United States Patent
Golubiewski et al.

(10) Patent No.: US 6,771,626 B1
(45) Date of Patent: Aug. 3, 2004

(54) DATA COMMUNICATION TECHNIQUES FOR REAL TIME DATA TRANSMISSION

(75) Inventors: Terry J. Golubiewski, Cedar Rapids, IA (US); C. David Young, Plano, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 778 days.

(21) Appl. No.: 09/649,665

(22) Filed: Aug. 29, 2000

(51) Int. Cl.[7] .................................................. H04J 3/00
(52) U.S. Cl. .................... 370/336; 370/347; 370/412
(58) Field of Search ............................... 370/321, 336, 370/337, 345, 347, 348, 412, 442, 461, 462, 463

(56) References Cited

U.S. PATENT DOCUMENTS

| | | | |
|---|---|---|---|
| 5,719,868 A | | 2/1998 | Young ........................ 370/436 |
| 6,014,089 A | * | 1/2000 | Tracy et al. ........... 340/870.02 |
| 6,088,659 A | * | 7/2000 | Kelley et al. .................. 702/62 |
| 6,369,719 B1 | * | 4/2002 | Tracy et al. ........... 340/870.02 |
| 6,384,739 B1 | * | 5/2002 | Roberts, Jr. .................. 340/905 |
| 6,529,443 B2 | * | 3/2003 | Downey et al. .............. 367/76 |
| 6,556,899 B1 | * | 4/2003 | Harvey et al. ................ 701/29 |

* cited by examiner

*Primary Examiner*—Min Jung
(74) *Attorney, Agent, or Firm*—Nathan O. Jensen; Kyle Eppele

(57) ABSTRACT

An communication scheme is disclosed. A collection of data samples is gathered and stored. One or more communication slot opportunities for the participant are identified in the time division communication scheme. Gathered data can be retrieved by an agent at a time just prior to communication. The agent can retrieve data according to a priority scheme. The retrieved data can then be loaded into a packet and transmitted in the communication slot opportunity to which its agent is related. The agents can be queued instead of the actual data to be communicated. Further, agents can be queued such that each level in the queue relates to a different communication slot opportunity. In addition, a plurality of agents can be activated to gather data to be communicated in a single communication slot.

18 Claims, 3 Drawing Sheets

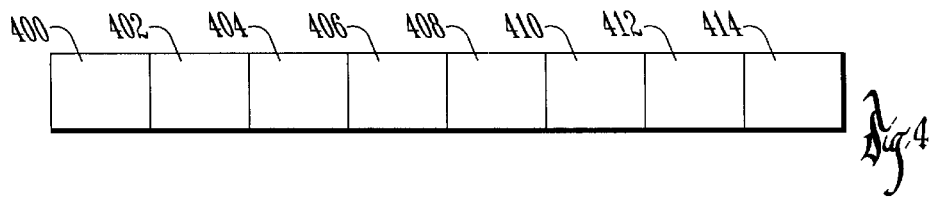
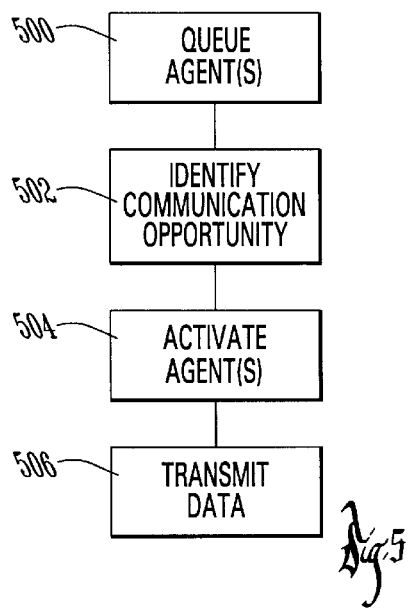
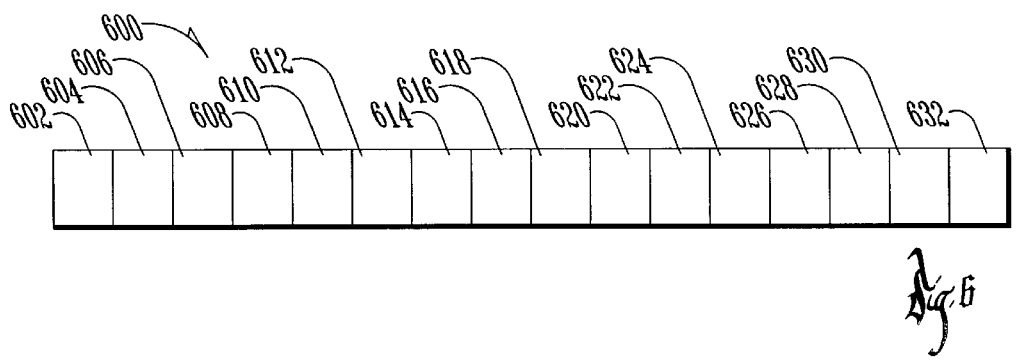

DATA COMMUNICATION TECHNIQUES FOR REAL TIME DATA TRANSMISSION

GOVERNMENT LICENSE RIGHTS

The U.S. Government has a paid-up license in this invention and the right in limited circumstances to require the patent owner to license others on reasonable terms as provided for by the terms of contract No. 82246 awarded by the Office of Naval Research.

FIELD OF THE INVENTION

The present invention generally relates to an improved data transmission technique, more particularly relates to a technique for managing the transmission of data sampled in real time, and even more particularly relates to a buffer management technique utilizing agents for use in data transmission.

BACKGROUND OF THE INVENTION

In many situations, data sampled or otherwise acquired in real time, or in a manner analogous to real time acquisition, cannot be forwarded immediately after acquisition. For example, due to the demands of the application being served or the requirements of the associated communication environment, data may have to be held or queued until a transmission opportunity arises. In a time division communication environment, data may have to be stored until the arrival of a time slot assigned to the node or to the node's intended receiver. When the appropriate assigned time slot arrives, the data will be transmitted.

In certain applications, the latency period added by the time spent waiting for a transmit opportunity is not significantly detrimental to the desired performance of the system. In other applications, however, the added latency can result in diminished performance or even catastrophic failure. For example, this type of latency may be of little or no consequence to the performance of a statewide temperature monitoring and reporting network. In applications involving the remote control of high-speed vehicles, however, the vehicle can travel a significant distance during a delay of just a few milliseconds. Thus, due to latency, the actual location of the vehicle may be significantly different than the location information being presented to an operator. Consequently, guidance errors can result.

FIG. 1 depicts the data management technique typically employed when sampled data is to be transmitted. A factor of interest is sampled 100 pursuant to some schedule, cycle or other triggering event. Each sample is then queued 102 into storage. The storage component operates as a first-in-first-out system (FIFO). As each transmit opportunity arises, the appropriate sample is transmitted 104. Since a FIFO system is used, the oldest stored sample will be the next to be transmitted. Thus, the sample being transmitted may be substantially different than the sample being currently taken. As a result, the sample being transmitted may not adequately represent the actual state of the system at the time of transmission.

Consequently, there exists a need for a data management technique that will reduce latency. A flexible system that can capture a sample closer to the time of its transmission is needed. These needs and others are fulfilled by the inventions disclosed in the following description.

SUMMARY OF THE INVENTION

It is an object of the present invention to provide an improved data management technique for data communication.

It is a feature of the present invention to utilize an agent that retrieves a sample just prior to the time of communication.

It is an advantage of the present invention to reduce latency in the communication of sampled data.

The present invention involves an improved buffer management technique for data communication. It is carried out in a "delay-reduced" manner in the sense that filled data packets are not queued for later transmission. Rather, an agent retrieves a data sample at a point just prior to transmission and inserts it into the packet. In another embodiment, one or more agents are queued along with a reservation of communication space, then, at a time just prior to transmission, the agent or agents are activated to retrieve and insert data into the communication packet.

BRIEF DESCRIPTION OF THE DRAWINGS

The invention may be more fully understood by reading the following description of the invention, in conjunction with the appended drawings wherein:

FIG. 4 depicts a plurality of communication time slots in a time division communication system suitable for use with the present invention.

FIG. 5 is a flowchart depicting another embodiment of the present invention.

FIG. 6 depicts an embodiment of a frame of sixteen time slots.

DETAILED DESCRIPTION

The present invention is designed for use in environments wherein data samples are acquired or gathered and then must be communicated, either wirelessly or via wired media, on a time division basis. The terms transmit and communicate, as used herein, are both intended to encompass wired and wireless forms of communication. A communication protocol such as a time division multiple access (TDMA) system, for example, may be used with the present invention. Further, the communication framework may include a plurality of different frequency channels or may include a code division multiple access (CDMA) structure. It will be appreciated that the present invention can also be used with a variety of other known communication systems and enhancements.

The time division communication schedule may employ static or a dynamic allocation of the communication slots. The present invention can be used with either method or with a combination of the two methods. An example of one dynamic assignment protocol such as may be used with the present invention is disclosed in U.S. Pat. Nos. 5,719,868. 5,719,868, issued Feb. 17, 1998, is hereby incorporated herein by reference in its entirety, including all drawings and appendices. Basically, the present invention will benefit any time division communication scheme wherein a node cannot transmit whenever it wishes, but must sometimes wait for a transmit opportunity.

Figure 1:
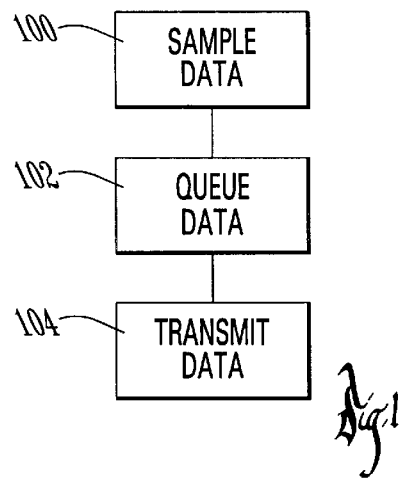
FIG. 1 is a flowchart depicting the gathering and communication of queued data samples.
Figure 2:
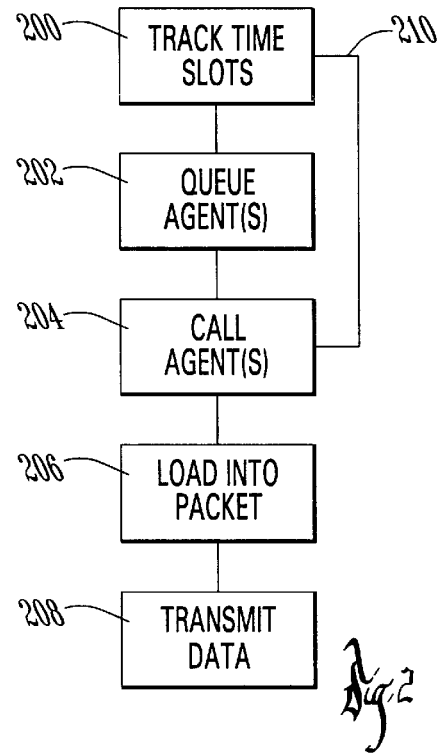
FIG. 2 is a flowchart depicting an embodiment of the present invention wherein data is not queued to await communication.

Referring now to FIG. 2, a chart applicable to the operation of several embodiments of the present invention is depicted. An apparatus with information to communicate will track 200 the time slots of the time division communication schedule in which it participates. The apparatus will determine or learn, by a static or a dynamic assignment for example, which communication slot or slots will provide it with an opportunity to transmit its data.

Concurrent with the afore-described communication management duties, the apparatus will also be generating the data to be communicated. For example, it may be periodically sampling the status of a variable of interest. Typical examples of such sampling include optical and/or audio sensing of a given environment (video or audio applications). Other types of sensing or data gathering include measurement of other physical attributes such as speed, direction, location, temperature, color, texture, weight, number, etc.

The following descriptions highlight but a couple of the multitude of applications for which the present invention is useful. These descriptions are provided only by way of example and are not intended to be limiting to any extent. It will be appreciated that the present invention is also useful in a wide range of other applications.

In a medical application, a specialist at one location can perform a medical procedure on a patient at another location by using, for example, computerized, robotic equipment, video feedback and a communication system. At the patient's location, an optical sensor can periodically capture an image of a remotely controlled robotic instrument as the medical procedure progresses. The instrument may be, for example, a remotely controlled cutting device. In performing the procedure, the specialist guides the instrument to the proper position and then sends a command causing the instrument to perform a desired function. If the video samples are queued and sent in a FIFO fashion as transmit opportunities arise, however, the resulting latency may cause the specialist's view of the instrument to depict a position significantly different, for the purposes of the procedure, than its actual present position. Consequently, when the command is given to cause the instrument to perform the next desired function (for example, extend or create an incision), the function will be performed at a location different from that desired and expected by the specialist.

Avionic applications present another example of the usefulness of the present invention. A remotely controlled airborne vehicle, for example, can include a camera to provide video feedback to its remote pilot. Hence, the string of periodically gathered video samples are at least one of the data types gathered by the airborne apparatus. Other data (for example, altitude, speed, fuel, operational, environmental or radar data) may additionally or alternatively be collected. If the gathered data, for example the video or location data, is queued and then communicated in a FIFO fashion as communication opportunities (allocated communication slots) arise, a vehicle with high speed will have a location or be in an environment significantly different than the location or environment being simultaneously presented to the remote operator.

Since the guidance commands given by the operator will be based on aged data, guidance errors will result. Consequently, it will be difficult if not impossible to accurately guide the airborne vehicle to a desired location or to avoid an identified obstacle. Accordingly, the present invention is particularly useful for all manner of robotic-type, remotely controlled, applications involving high speeds, close tolerances or other rapidly varying parameters.

Figure 3:
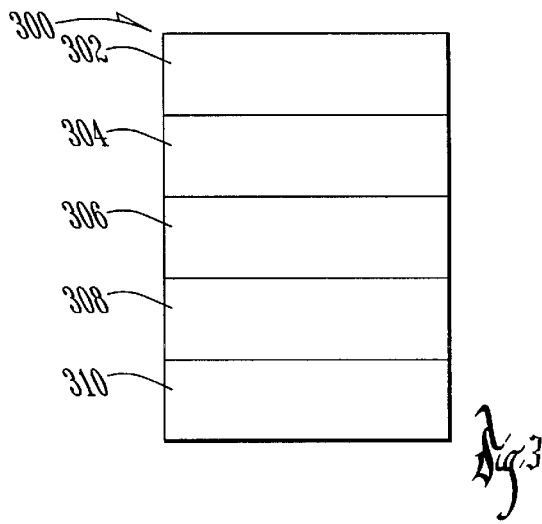
FIG. 3 is a block diagram representation of an embodiment of a reservation queue'suitable for use with the present invention.

Referring again to FIG. 2, upon identifying the next communication opportunity or opportunities, a reservation is placed 202 into a reservation queue. An embodiment of a reservation queue 300 is depicted in FIG. 3. Unlike the latency enhancing 'data queue' previously described, the 'reservation queue' 300 does not contain any of the gathered data samples at the time the reservation is made. Rather, the reservation queue holds one or more communication reservations in its reservation slots 302, 304, 306, 308, 310. Although five reservation slots are depicted in FIG. 3, this is only for illustrative purposes. The number of reservation slots used in a given embodiment will be chosen to suit the needs of the particular application at hand.

A communication reservation indicates an agent that will help prepare a packet for transmission in the identified communication slot opportunity with which it is related. An agent can be a section of code, for example an object written in an object-oriented language such as C++. Calls to the indicated agent are queued instead of the data itself. At a time just prior to transmission, the agent is activated 204 and proceeds to retrieve a portion of the gathered (sampled) data pursuant to a given criteria. Therefore, the data that is communicated will not have been aged by the queuing process, but will have been freshly acquired and loaded 206 into the packet just in time for transmission 208. Latency is reduced and the agent can further be designed to provide additional enhancements to the data communication process.

In one embodiment, the agent is a parameter in a transmit function. Other parameters of the transmit function can include the identified communication slot and the transmission parameters. The communication slot can be identified by a given name or label or, for example, by a synchronized timing technique. The transmission parameters can identify the particulars of the communication media to be used. In a radio frequency communication system, for example, the transmission parameters can define the radio frequency transmission parameters to be used for the packet.

Each agent indication can also indicate the capacity of the data portion of the related communication opportunity. The capacity can be calculated, for example, by subtracting the packet header size from the size of the identified communication slot. The capacity indication can be included to ensure that the data retrieved is not too large to fit in the identified communication slot. Any bytes not filled with the data retrieved by the agent can be set to zero.

Upon activation 204, an agent retrieves the data sample that has the highest priority according to an established hierarchical priority scheme. In one embodiment, the agent may have only one priority. For example, its only task may be to obtain the most recently captured data sample. In another embodiment, the agent may be programmed to retrieve a data sample only if the sample is sufficiently current (for example, only if the data had been gathered within a specified time period prior to the activation of the agent). If it is unable to retrieve the designated data, the agent can terminate without returning any data sample.

In yet another embodiment, the agent may be tasked to first attempt to retrieve a certain type of data sample (the most recent video sample, or audio sample for example). If it is unable to retrieve such a sample, if there is a malfunction in the video sampler so that no data has been gathered for example, the agent can attempt to retrieve the data type specified as its second priority. If the second priority data is not available, a third priority retrieval can be attempted, and so forth.

At a time just prior to the identified communication slot opportunity, the agent is called to retrieve the data sample that meets its retrieval criteria (based on time or some other priority). FIG. 4 depicts a chain of adjacent time slots for a given channel in a time division communication scheme. The time slots 400, 402, 404, 406, 408, 410, 412, 414 represented in FIG. 4 may constitute only a portion of a complete cycle. In the sequence depicted, the communication slot 400 occurs earlier in the cycle than the next communication slot 402 to the right. In other words, time advances as one moves from left to right across FIG. 4.

The number of time slots in a cycle and the duration of each time slot is application dependent. Many different numbers and durations of time slots can be used with the present invention. Any depictions or descriptions presented herein in this regard are intended to be illustrative and not limiting. In one embodiment, for example, there are 256 communication slots in a cycle and each slot has a duration of 125 milliseconds. In another embodiment, a time slot may have a duration of four milliseconds. In yet other embodiments, there may be a different number of slots in a cycle and/or the slots may have a different duration.

Suppose that the last time slot 414 in the sequence of FIG. 4 has been identified as a communication opportunity for a particular node of a wired or wireless network. In one embodiment of the present, the agent is called or activated during or at the start of the immediately preceding time slot 412. In this embodiment, the agent may be activated at the beginning, for example, of the preceding time slot 412 and it will proceed to retrieve a gathered data sample and pass it on for any required further processing during the remainder of the time slot 412. The agent may, for example, pass the retrieved data to a compressor/decompressor component (codec) for further processing prior to placing the data into the communication packet.

Suppose that the time slot duration of this embodiment is ten milliseconds. The agent can be activated at the beginning of the time slot in which it is called and can be programmed to retrieve data according to the established criteria during the first five milliseconds of the time slot. During the last five milliseconds of the time slot, the retrieved data can be compressed by a codec and loaded 206 into the packet for transmission 208.

In another embodiment, the agent can be called during the same communication slot in which the data will be transmitted. For example, suppose that the identified communication slot opportunity for the node is the next to last slot 412 of FIG. 4. If the time slot is long enough and the agent is fast enough, the agent can be called during that same time slot 412 and the data can be packetized and transmitted before the time slot 412 ends.

In other embodiments, the agent can be called two, three, four or more slots before the identified communication slot opportunity. For example, in one embodiment the identified communication slot opportunity may be the third slot 410 from the right in FIG. 4 and the agent may be activated to retrieve the data three slots 404 earlier. In another embodiment the agent may be activated five slots 400 before the identified communication slot opportunity. The amount of time between the activation of the agent and the actual transmission of the data will depend on the application at hand and the hardware being used.

Further, in a more complex embodiment, more than one agent can be related to a single communication slot opportunity. Suppose that the seventh communication slot 412 is an identified communication opportunity. Two or more agents can be activated to retrieve data at the designated time, for example during the sixth time slot 410. Each agent can have a different task or a different priority of tasks to perform upon activation. In such an embodiment, if a reservation queue is being used, several agents can share the same reservation slot 302, 304, 306, 308 or 310 in the reservation queue. Each agent can also have an associated data size limit so that the capacity of the slot is not exceeded.

In a related embodiment, the plurality of agents related to the communication slot opportunity can be activated in series. The maximum retrieval limit imposed on each agent can be a function of the amount of room left in the packet after the prior agents have acted. For example, the first agent activated for a slot can have a retrieval limit equal to the total transmit slot capacity minus the header. The next agent for the slot can then be given a retrieval limit of the total transmit slot capacity minus the header and minus the size of the data sample (which may be compressed) retrieved by the first agent, and so forth. When the total transmit capacity has been filled, no further agents will be activated for that slot. Such a system can further be used to establish a prioritization of the agents for a slot. The first agent would have the highest priority and the last agent of the sequence would have the lowest priority.

In operation, there may be a plurality of identified communication slot opportunities. Suppose for example that three of the slots depicted in FIG. 4, the second 402, fifth 408 and eighth 414 slots, are communication opportunities for a given node. In such a case, the agent or agents related to each identified communication slot opportunity can be added to a reservation queue at a designated time prior to its related communication slot. For example, each can be added to the reservation queue four slots prior to the communication slot for which it will be retrieving data. Thus, the agent or agents for the fifth communication slot 408 will be queued during the first depicted time slot 400 and the agent or agents for the eighth time slot 414 will be queued during the fourth time slot 406.

Each agent can then be activated to retrieve data at a specified activation time prior to its related communication slot. For example, in an application wherein agents are activated only one slot prior to the related transmission slot, the agent or agents for the second communication slot 402 are activated during the first depicted communication slot 400, the agent or agents for the fifth communication slot 408 opportunity are activated during the fourth communication slot 406 and the agent or agents for the eighth communication slot 414 are activated during the seventh communication slot 412. Thus, each agent is removed from the reservation queue and activated at the designated time.

In an embodiment wherein the same agent or agents are used to retrieve data for every identified communication slot opportunity, the reservation queue 202 can be omitted or bypassed 210. In this embodiment, the same agent or agents are simply activated 204 at the appropriate specified time prior to each of the node's identified communication slot opportunities. Accordingly, FIG. 2 depicts the bypass 210 (or omission) of the reservation queue as is appropriate for such embodiments.

FIG. 5 depicts another embodiment of the present invention that takes a different approach. Rather than first identifying a communication slot opportunity and then queuing the appropriate agent.or agents in a reservation queue, this embodiment first places 500 the desired agent or agents in a reservation queue and then identifies 502 a communication slot opportunity to use for transmitting any data retrieved by the agent. The agent or agents are then activated 504 at the specified time and the data is subsequently transmitted 506 in the identified communication slot.

In an embodiment not using a reservation queue, the node simply activates 504 the same agent or agents during each communication slot. If the communication slot related to the activated agent or agents is subsequently identified as a communication slot opportunity for the node, the data retrieved by the agent or agents will be transmitted 506. Thus, the first two steps 500, 502 are not performed. If, however, the related communication slot turns out not to be a communication opportunity for that node, the data retrieved by that agent or agents will not be transmitted. This procedure is then followed for each successive time slot and for the agent or agents activated therein.

FIG. 6 depicts an embodiment of a two-way frame 600 that can be used with the buffer management system. This embodiment of the frame 600 contains sixteen slots 602, 604, 606, 608, 610, 612, 614, 616, 618, 620, 622, 624, 626, 628, 630, 632. In one implementation, there are sixteen such frames 600 per second (for a total of 256 slots per second). It will be appreciated, however, that other numbers of slots and frames can also be used.

In the two-way frame 600, some slots are used for transmission in one direction (for example from node A to node B) and other slots are used for transmission in the other direction (from node B to node A for example). In one embodiment, the first four slots 602, 604, 606, 608 are designated for use by one node and the last twelve slots 610, 612, 614, 616, 618, 620, 622, 624, 626, 628, 630, 632 are designated for use by the other node. For example, the first four slots 602, 604, 606, 608 can be used to communicate control signals to a remote device and the last twelve slots 610, 612, 614, 616, 618, 620, 622, 624, 626, 628, 630, 632 can be used to transmit gathered data (audio, video or other data for example) from the remote device back to the operator.

The grouping and designation of the various slots can be chosen to meet the needs of the particular application being implemented. For example, the direction of communication can be changed with every slot (slots 602, 606, 610, 614, 618, 622, 626, and 630 being used to transmit in one direction and slots 604, 608, 612, 616, 620, 624, 628 and 632 being used to transmit in the other direction). In another embodiment, a repeating pattern uses one slot for transmission in one direction followed by three consecutive slots for transmission in the other direction. In yet another embodiment, a repeating pattern uses seven consecutive slots for transmission in one direction followed by one slot for transmission in the other direction. Many such arrangements can be implemented.

Figure 7:
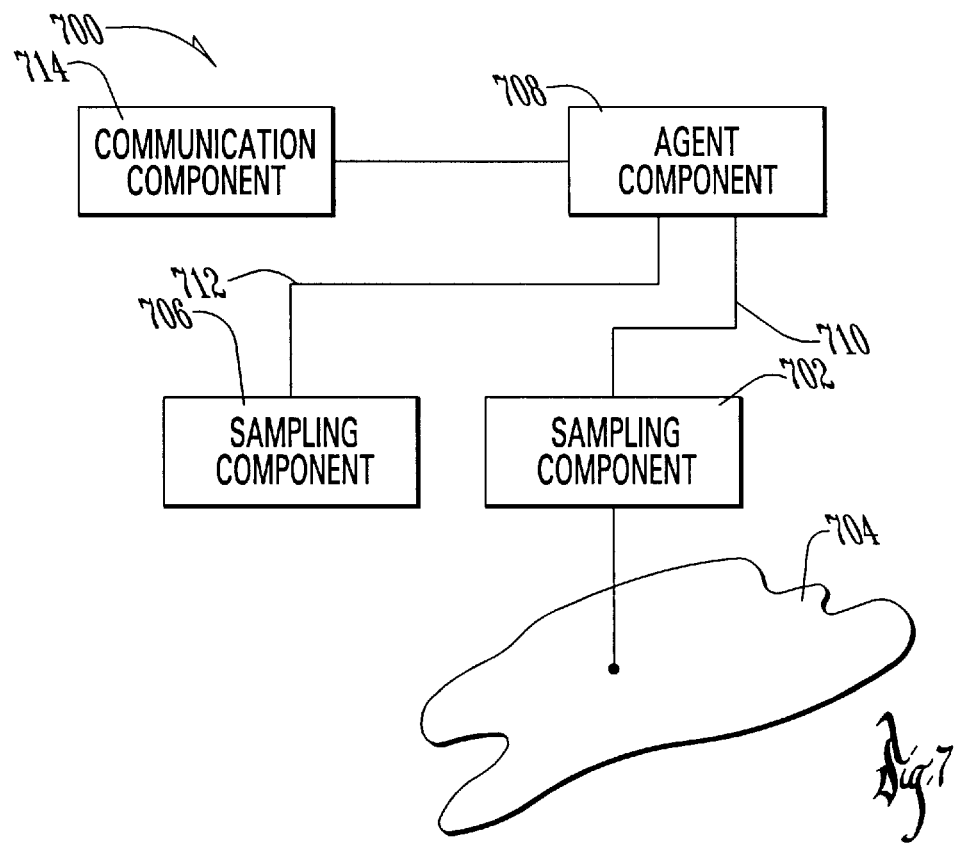
FIG. 7 is a block diagram representation of an embodiment of a communication apparatus in accord with the teachings of the present invention.

FIG. 7 depicts the components included in the structure 700 of one embodiment of the present invention. A sampling component 702 gathers data from some field of interest 704 (an image of the environment surrounding a remote device for example). Further, the structure 700 can include one or more additional data gathering components 706 gathering other data of interest.

An agent holding component 708 is communicatively coupled 710, 712 with each sampling component 702, 706. The agent holding component 708 is a memory holding the agent (or a designation of the agent) to be activated or holding a queue of designations as disclosed above. As further disclosed above, upon activation the designated agent or agents will attempt to retrieve their respective data from the appropriate sampling component 702, 706. The structure 700 further includes a communication component 714 that maintains the time division protocol and facilitates the creation and communication of the communication packets. The communication component 714 is communicatively coupled with the agent holding component 708 so that the appropriate agent or agents can be activated at the proper point in the time division communication scheme. Additional components can also be coupled with the structure 700 to meet the needs of the particular application at hand.

Figure 8:
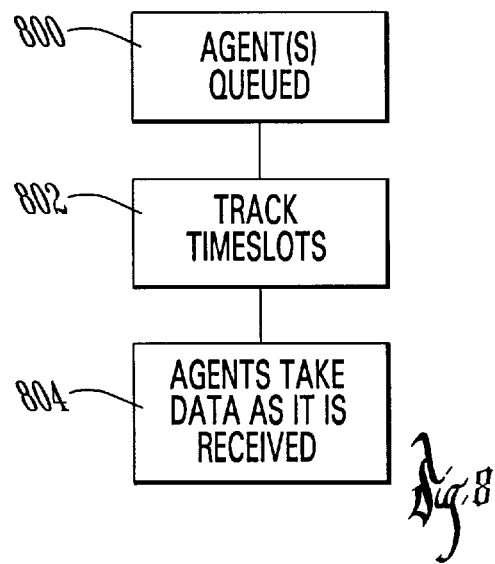
FIG. 8 is a flowchart of an embodiment of the operation of a receiving apparatus in accord with the teachings of the present invention.

Agents can also be employed on the receiver side of the process. In prior systems, data received during a communication slot is queued and is later retrieved by the appropriate application program for further handling and/or processing. FIG. 8 depicts a flowchart of an embodiment using agents to coordinate data reception. First, agents are queued 800 to handle the data type and format of the data expected to be received in a particular communication slot. Timeslots are continually tracked 802. When the communication slot's data is received, the agent (or agents) related to that communication slot is activated and thereupon handles and/or processes the received data pursuant to its instructions 804. As a result, received data is not aged in a queue, but is handled promptly upon reception.

It is thought that the method and apparatus of the present invention will be understood from the description provided throughout this specification and the appended claims, and that it will be apparent that various changes may be made in the form, construct steps and arrangement of the parts and steps thereof, without departing from the spirit and scope of the invention or sacrificing all of their material advantages. The forms herein described are merely exemplary embodiments thereof.

What is claimed is:

1. A method of handling data, by a participant in a time division communication system, comprising the steps of:
   gathering a succession of data samples;
   identifying a communication slot in a time division communication schedule that can be used by the participant for data communication;
   queuing a retrieval agent in a reservation queue, the retrieval agent configured to retrieve data to be communicated in the identified communication slot;
   activating the retrieval agent to retrieve, just prior to communicating during the identified communication slot, a gathered data sample; and
   inserting the retrieved data sample into a packet to be communicated in the identified communication slot.

2. The method of claim 1, further comprising the step of dynamically assigning, prior to said identifying step, a communication slot of the time division communication schedule to the participant.

3. The method of claim 1, wherein said activating step is performed during the identified communication slot in which the data retrieved by the retrieval agent will be transmitted.

4. The method of claim 1, wherein said activating step is performed during a communication slot immediately preceding the identified communication slot in which the data retrieved by the retrieval agent will be transmitted.

5. The method of claim 1, wherein the retrieval agent is configured to retrieve data from a plurality of data sources having an order of priority such that data from a low-priority data source is retrieved by the retrieval agent if the retrieval agent is unable to retrieve data from a high-priority data source.

6. The method of claim 1, wherein the step of queuing the retrieval agent in a reservation queue occurs prior to said identifying step.

7. The method of claim 1, wherein the retrieval agent is one of a plurality of retrieval agents, and wherein said activating step further comprises activating the plurality of retrieval agents to retrieve a respective plurality of data samples to be communicated in the identified communication slot.

8. The method of claim 1, wherein said retrieval agent is a first retrieval agent, and wherein said queuing step further comprises the step of queuing a second retrieval agent in the reservation queue, the second retrieval agent being capable of retrieving data for communication in an additional identified communication slot.

9. The method of claim 1, wherein said retrieval agent is a first retrieval agent, and wherein said queuing step further comprises the step of queuing a second retrieval agent with the first retrieval agent in the reservation queue, the second retrieval agent also being capable of retrieving data for communication in the identified communication slot.

10. The method of claim 1, further comprising the step of communicating the retrieved data sample via the time division communication schedule.

11. The method of claim 10, further comprising the step of receiving a communication from another participant in the time division communication system via the time division communication schedule.

12. The method of claim 11, wherein said communicating and receiving steps are performed within the context of a two-way frame.

13. The method of claim 1, wherein the retrieval agent retrieves a data sample only if the data sample was gathered within a predetermined time.

14. The method of claim 1, wherein the retrieval agent is a first retrieval agent from a plurality of retrieval agents configured to retrieve data samples to be communicated in the identified communication slot, wherein each of the plurality of retrieval agents are associated with a different data sample, the method further comprising:

retrieving a data sample associated with the first retrieval agent;

communicating the data sample associated with the first retrieval agent during the identified communication slot;

retrieving a data sample associated with another of the plurality of retrieval agents if it is determined there is sufficient time remaining in the identified communication slot to transmit said data sample; and communicating the data sample associated with said another of the plurality of retrieval agents during the identified communication slot.

15. A data communication apparatus, comprising;

a fist data gathering component;

a data storage component, coupled with said data gathering component, capable of storing data gathered by said data gathering component;

a data retrieval component comprising a memory containing a retrieval program, said data retrieval component coupled with said data storage component; and said data retrieval component having a retrieval program queue associated therewith, the retrieval program queue configured to indicate the retrieval program until the retrieval program is activated to retrieve data in preparation of transmission in an identified communication slot; and a time division data communication component, coupled with said data storage component;

wherein, at a time just prior to data transmission, the retrieval program is activated to retrieve data from said data storage component and transfer it to said time division data communication component for data transmission in the identified communication slot.

16. The data communication apparatus of claim 15, wherein the retrieval program is a first retrieval program, and wherein said data retrieval component further has a second retrieval program associated therewith that, at a time just prior to data transmission, can be activated to retrieve data from said data storage component and transfer it to said time division data communication component for data transmission.

17. The data communication apparatus of claim 16, wherein the data gathering component is a first data gathering component, and further comprising a second data gathering component coupled with said data storage component.

18. The data communication apparatus of claim 15, wherein a location in said retrieval program queue can indicate a plurality of retrieval programs.

* * * * *